United States Patent
Beyerlein et al.

(10) Patent No.: US 6,520,666 B1
(45) Date of Patent: Feb. 18, 2003

(54) APPARATUS FOR LIGHTING SPACES, BODIES OR SURFACES

(75) Inventors: Wolfgang Beyerlein, Mitteleschenbach (DE); Thomas Krummer, Weissenburg (DE)

(73) Assignee: Diehl Luftfahrt Elektronik GmbH, Röthenbach (DE)

( * ) Notice: Subject to any disclaimer, the term of this patent is extended or adjusted under 35 U.S.C. 154(b) by 0 days.

(21) Appl. No.: 09/495,990

(22) Filed: Feb. 1, 2000

(30) Foreign Application Priority Data

Feb. 24, 1999 (DE) .......................... 199 08 040

(51) Int. Cl.[7] ................ F21V 5/04; F21V 1/00
(52) U.S. Cl. ................ 362/471; 362/244; 362/511; 362/520; 362/545; 362/248
(58) Field of Search .................. 362/244, 245, 362/246, 545, 551, 555, 559, 581, 470, 471, 472, 494, 248, 511, 512, 520–522, 490; 359/618, 619, 626, 628

(56) References Cited

U.S. PATENT DOCUMENTS

| | | | | |
|---|---|---|---|---|
| 4,329,737 A | * | 5/1982 | Triller | 362/555 |
| 4,733,335 A | * | 3/1988 | Seizawa et al. | 362/545 |
| 4,754,380 A | * | 6/1988 | Wang | 362/244 |
| 4,903,175 A | * | 2/1990 | Cotton | 362/471 |
| 5,325,275 A | * | 6/1994 | Liu | 362/490 |
| 5,388,035 A | * | 2/1995 | Bodem, Jr. | 362/545 |
| 5,436,809 A | * | 7/1995 | Brassier et al. | 362/545 |
| 5,490,049 A | * | 2/1996 | Montalan et al. | 362/245 |
| 5,508,897 A | * | 4/1996 | Van Order | 362/490 |
| 5,647,657 A | * | 7/1997 | Damasky et al. | 362/555 |
| 5,669,698 A | * | 9/1997 | Veldman et al. | 362/245 |
| 5,671,996 A | * | 9/1997 | Bos et al. | 362/494 |
| 5,873,644 A | * | 2/1999 | Roessner et al. | 362/551 |
| 6,152,590 A | * | 11/2000 | Furst et al. | 362/545 |

FOREIGN PATENT DOCUMENTS

| | | |
|---|---|---|
| DE | 195 14 424 A1 | 11/1995 |
| EP | 0 523 927 B1 | 1/1993 |
| WO | WO 97/26483 | 7/1997 |

* cited by examiner

*Primary Examiner*—Alan Cariaso
(74) *Attorney, Agent, or Firm*—Scully, Scott, Murphy & Presser

(57) ABSTRACT

An apparatus for lighting or illuminating spaces, bodies or surfaces, which is formed from a plurality of light emitting diodes (1). The light emitting diodes (1) are radially enclosed by a casing body (14) which is adjoined at the end by a tubular element (15) which bears against a lens (4). A set spacing is thereby established between the light emitting diode (1) and the lens (4). All light spots issuing from the light emitting diode (1) are projected to form a single light spot of a high level of brightness by virtue of the superimposed relationship at a spacing in front of the lens (4).

17 Claims, 5 Drawing Sheets

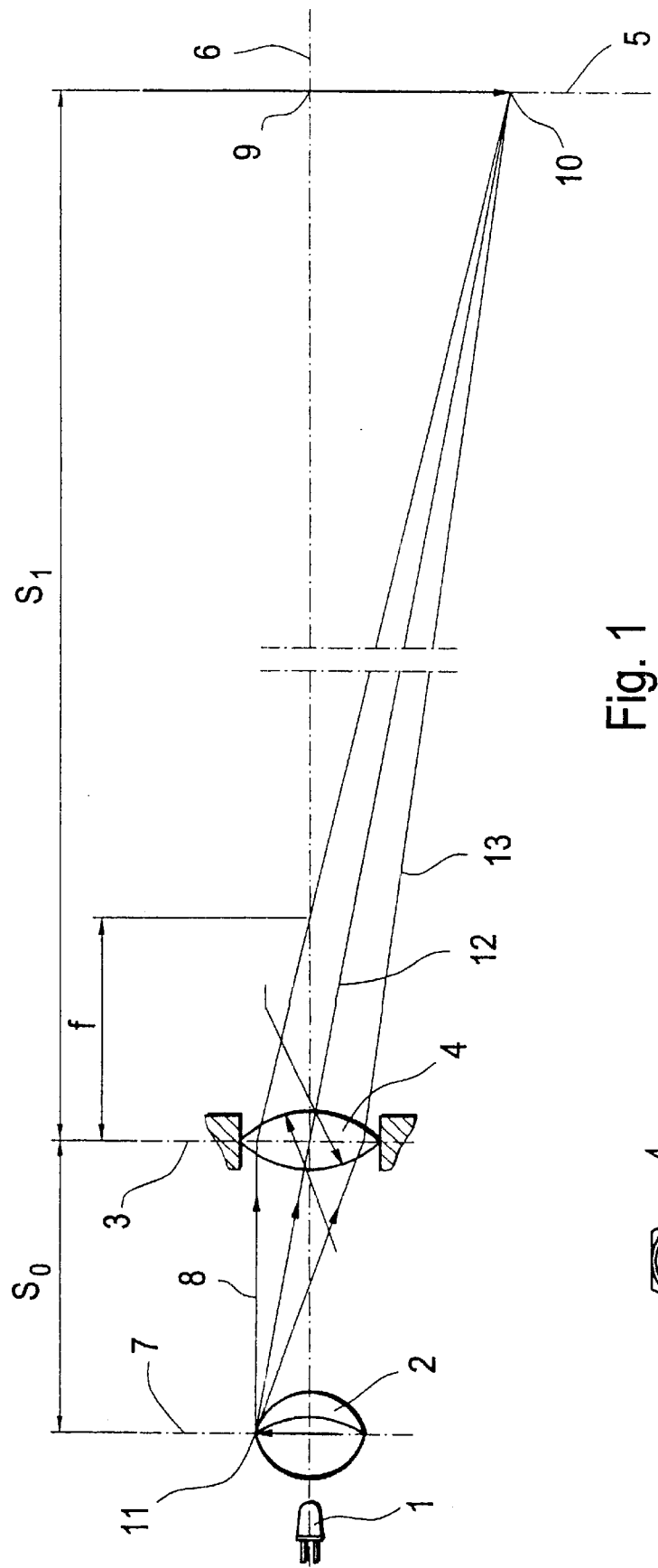
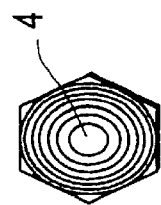
Fig. 1
Fig. 1a

Fig. 2
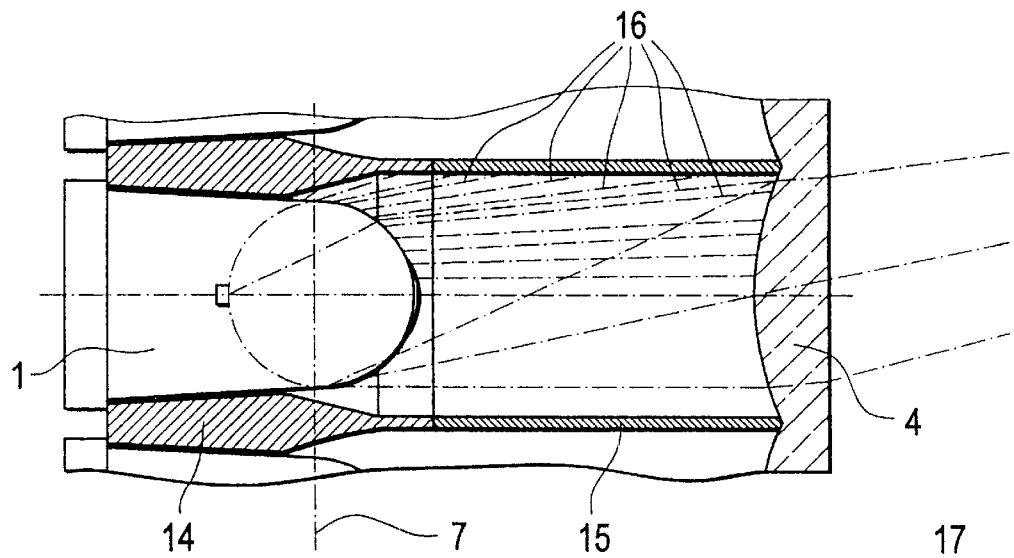
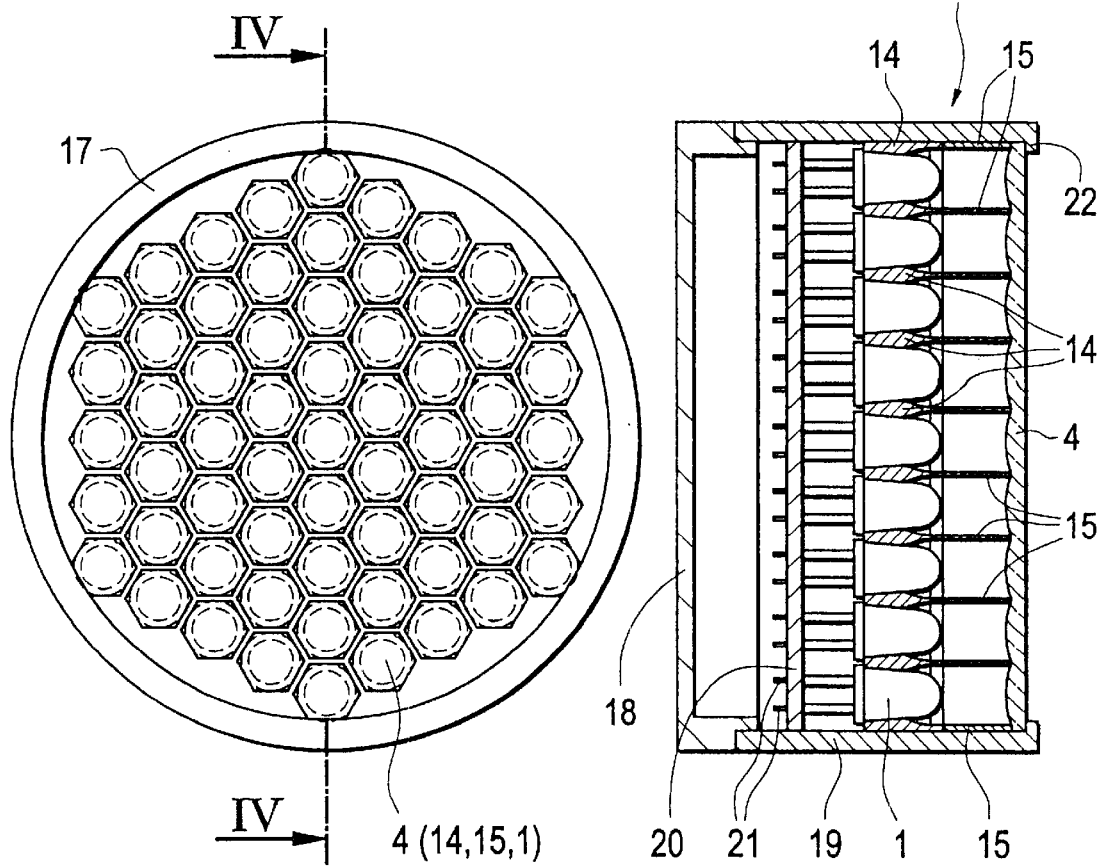
Fig. 3
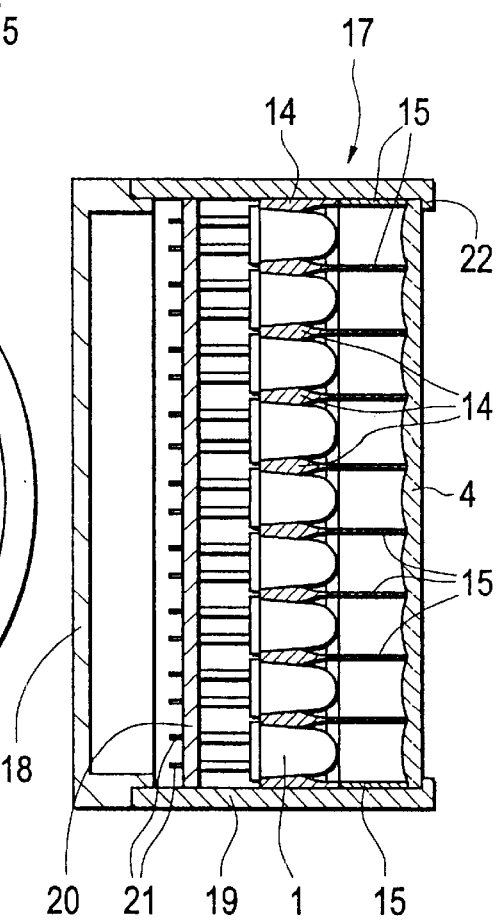
Fig. 4

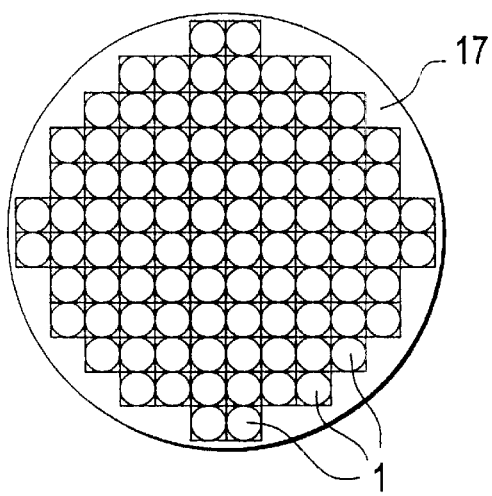
Fig. 5
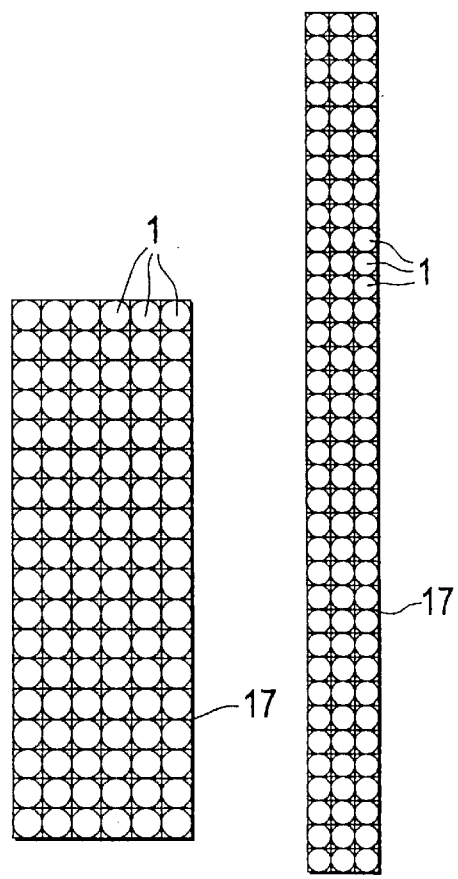
Fig. 6
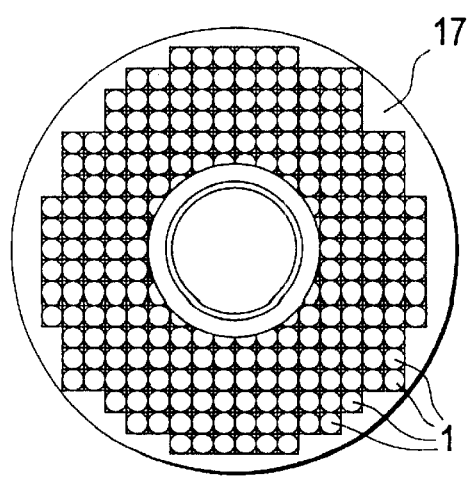
Fig. 7
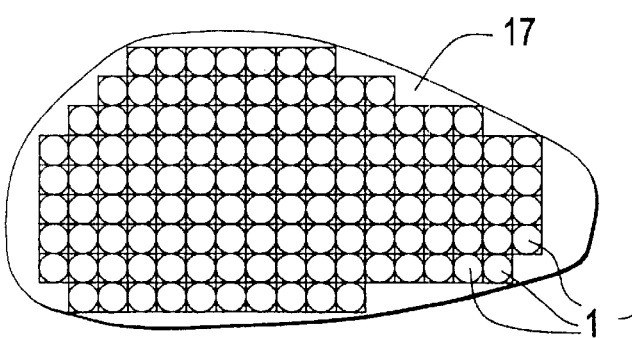

APPARATUS FOR LIGHTING SPACES, BODIES OR SURFACES

BACKGROUND OF THE INVENTION

1. Field of the Invention

The invention concerns an apparatus for lighting or illuminating spaces, bodies or surfaces, in particular such as a reading light for aircraft, including at least one light source in the form of a white light emitting diode or a luminescence conversion diode, which is connected to a power supply unit.

2. Discussion of the Prior Art

The applicants' earlier German patent application DE 198 43 330.1 which has hitherto not been published describes an aeroplane cabin lighting arrangement which comprises a plurality of spot-like light sources. Those spot light sources have at least one light emitting diode and are connected to at least one power supply unit. The arrangement of a plurality of spot light sources at or in the ceiling of the cabin of an aircraft provides for uniform illumination of the cabin. The use of light emitting diodes in the spot light sources makes it unnecessary to involve expensive electrical actuation of the cabin lighting. Furthermore the current consumption is considerably lower in comparison with the use of conventional incandescent lamps. Finally, as is known, the service life of light emitting diodes is many time greater than the service life of fluorescent tubes or incandescent lamps so that there is no longer any need for the expensive operation of replacing defective lamps. That prior patent application also already described the point that, depending on the respective density of the spot light sources arranged at the ceiling of the aeroplane cabin, the lighting arrangement can be used as reading lamps over individual seat places. Preferably, the light emitting diodes used are white light emitting diodes which can involve units formed from two-coloured or multi-coloured light emitting diodes or so-called luminescence conversion diodes.

The use of light emitting diodes is also involved in many situations in transport engineering. Thus for example DE 195 14 424 A1 discloses using compatible lenses in relation to two different light sources, for the light of a motor vehicle. This involves a motor vehicle delimitation or position light with a lens which was designed both for illumination with light emitting diodes and also with incandescent lamps. The lens was therefore designed in such a way that it has a set of steps for each of the different light sources, in order to provide for a desired scatter effect in respect of the light source. Overall it is to be stressed in relation to this publication that it only illustrates a delimitation or boundary light, that is to say the amount of light given off is only so much as to detect a contour or delimitation of a vehicle by the rear lights. Lighting or illumination of a surface or a body is not something that this disclosed light seeks to achieve, for which reason that light can be associated with the field of passive lights.

WO 97/26483 discloses a light emitting diode lamp arrangement for use in signal lamps or traffic lights. This publication is also in principles concerned with providing sufficient light in various colours for it to be clearly recognised. For that purpose, the arrangement has a plurality of rows of light emitting diodes which are covered by a stepped lens in correlation therewith. Due to the step configurations of the lens, the arrangement enables the light to be emitted at given angles relative to the beam axis in order to be clearly visible from various angles and under all weather influences.

EP 0 523 927 B1 describes a fluorescent lamp with lens. In that respect, it is to be inferred as essential from that publication that a lens element for a light emitting diode has at least two facets, that is to say lens bodies. The facets, by virtue of refraction, form a desired exit beam.

SUMMARY OF THE INVENTION

Proceeding from the above-indicated state of the art as the basic starting point, the object of the invention is to provide an apparatus for lighting or illuminating spaces or rooms, bodies or surfaces, through which at an adjustable spacing from the light source there is attained a brightly lit surface which is relatively sharply distinguished from the surroundings, and which is referred to as an active light.

This structure in accordance with the invention provides a reading light based on light emitting diodes (LEDs) for particular use in air travel. A reading light of this kind is distinguished by a high level of safeguard against failure. The arrangement provides for a maximum amount of light from the light emitting diodes forwardly to the surface to be illuminated. Because of the high degree of reliability of the light emitting diodes, the change which is frequent when using conventional lighting means is no longer required. Furthermore the solution according to the invention affords for reading lights abroad design range and variable structural configurations. Further advantages are as follows:

- relatively sharp-edged projection of the light circle is achieved;
- the light output is proportional to the quantity of the light emitting diodes;
- in tests with subsequent measurements it was found that a quantity of 60 light emitting diodes for a reading light gives optimum results but it is also possible successfully to use smaller and larger quantities; and
- narrow lights are possible. which nonetheless produce a sufficiently large light spot.

BRIEF DESCRIPTION OF THE DRAWINGS

Examples of the invention are illustrated in the drawing in which:

FIG. 1 is a diagrammatic illustration of the theoretical model for the optical beam path of a reading light, FIG. 1a shows a front view of the lens in detail, FIG. 2 shows a view in longitudinal section of a light element, FIG. 3 shows a plan view of a reading light with light elements, FIG. 4 is a view in section of the reading light of FIG. 3 taken along line IV—IV.

FIG. 5 is a front view of a reading light with another arrangement of light elements, FIG. 6 shows a further front view of a reading light with light elements arranged in a different fashion, FIG. 7 shows yet another front view of a reading light with light elements arranged in a different fashion.

DETAILED DESCRIPTION OF PREFFERED EMBODIMENTS

Figure 8:
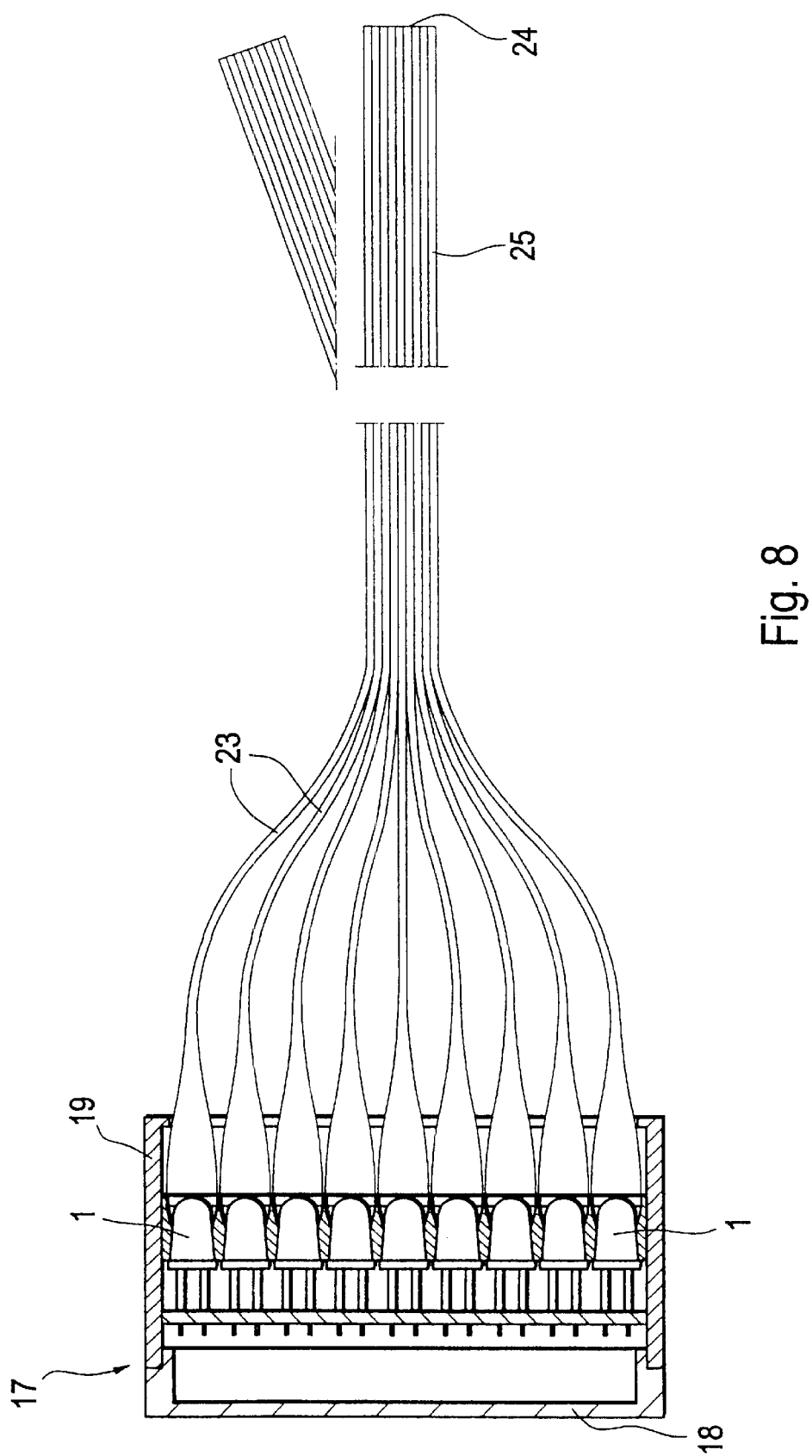
FIG. 8 is a view in section of a reading light with coupled light conductors.

In the theoretical model for representing the optical beam path for a reading light the lightsource which in accordance with the invention is a light emitting diode is identified by reference 1. The light emitting diode 1 has a front, substantially spherical light exit surface 2. In an advantageous use of the invention, preferably narrowly focusing light emitting diodes 1 (LEDs) are employed. A lens 4 is disposed in a main plane 3, at a selectable and adjustable spacing relative to the object plane 7 of the light emitting diode 1. Shown at a further adjustable spacing in front of the lens 4 with the main plane 3 is the focal plane 5 which, like the main plane 3, is arranged perpendicularly to the optical beam path 6. The spacing between the object plane 7 of the light emitting diode 1 and the main plane 3 of the lens 4 is identified by $S_0$ while the spacing between the main plane 3 of the lens 4 and the focal plane 5 is denoted by reference $S_1$. The ratio of the spacings $S_0$ to $S_1$ in the illustrated example is something like 100:1. The ratio is dependent on the area to be illuminated in the focal plane 5.

The optical beam path 6 extends from the light source 1 through the lens 4 on to the focal plane 5 in a continuous plane which is shown here as being horizontal. The light beams 8 which issue at the outer periphery of the light emitting diode 1 extend as far as entry into the main plane 3 of the lens 4 in parallel relationship to the optical beam path 6. The light beams 8 are deflected in the lens 4 in accordance with the laws of optics and impinge at a uniform radial spacing from the optical beam path 6 on the focal plane 5 and thereby mark off the light source on the focal plane 5, on a correspondingly enlarged scale. This means that the optical beam path impinges on the focal plane 5 at the point 9 and the two deflected beams 8 mark on the focal plane 5 the respective outer points 10, the mutual spacing of which represents the diameter of the light source whose image is formed on the focal plane 5. The light beam 8 which extends parallel to the optical beam path 6 issues at the point 11 from the object plane of the light emitting diode 1. The optical beam 12 is taken off from the same point 11 on the object plane and passes through the centre of the lens 4 and ends at the focal plane 5 again precisely at the point 10. The third light beam 13 from the exit point 11 enters at the lower edge region of the lens 4 and is deflected in such a way that it also impinges at the point 10 of the focal plane. The light beams 8, 12, 13 with the exit point 11 and the impingement point 10 are subject to the condition that:

$$f = \frac{S_0 \times S_1}{S_0 + S_1}$$

wherein f denotes the focal length of the lens 4.

The image of the light source, namely the light emitting diode 1, is formed on the focal plane. In accordance with the ratios which are predetermined in the example shown in respect of the spacing $S_1$ to the spacing $S_0$ the imaging scale of the light source on the LED lens is about 10:1 while the imaging scale for the light source in the focal plane 5 is about 10:1.

In accordance with the detail shown in FIG. 1a, the lens 4 is preferably fitted into a holder of hexagonal cross-section.

FIG. 2 shows a detail of a light element on an enlarged scale. The light emitting diode 1 as the light source is fitted at the bottom into a suitable holder with electrical connection. Disposed once again at the spacing $S_0$ from the object plane 7 is the lens 4 which in this example is in the form of a lens body extending over a plurality of light emitting diodes. The optical beam path 6 extends in a manner corresponding to FIG. 1 in a horizontal line through the light emitting diode 1 and the lens 4. Arranged around the light emitting diode is a casing body 14 which relatively snugly embraces the light emitting diode 1 in the lower region and which is shaped as a slight conical opening approximately in the region of the object plane 7. The casing body 14 terminates at a small spacing axially in front of the light emitting diode 1. Fitted on to the casing body 14 at the end in flush relationship is a tubular element 15 which bears with its front end against the lens body 4. The casing body 14 and the tubular element 15 can also be in the form of a one-piece casing element. As can be seen from FIG. 2 the light beams 16 issuing from the light emitting diode extend in the lower region of the light emitting diode almost radially and impinge on the inside surface of the casing body 14. As the surface of the casing body 14 and also of the tubular element are of a non-reflecting nature, those light beams 16 are absorbed on the inside surface of the casing body. In the upper spherical portion of the light emitting diode the light beams 16 issue at a continuously decreasing angle and there impinge on to the inside surfaces of the casing body 14 and the tubular element 15 without being reflected. Only the light beams 16 which exit in a limited spherical front region of the light emitting diode 1 impinge unimpededly on the spaced lens 4 and are radiated from there on to the focal plane 5. This structure for the lens element clearly shows that the scatter or diffuse light of the light emitting diode 1 is absorbed while, in accordance with the aperture effect, only active light is passed through to the lens.

It will be seen from the front view of the reading light 17 shown in FIG. 3 that the lenses 4 and also the casing bodies 14 with the tubular elements 15 are of a hexagonal configuration in cross-section. That hexagonal cross-section permits a direct close arrangement of the lenses 4 and the casing bodies 14 respectively. In that way it is possible for a large number of light emitting diodes 1 with lenses 4 to be disposed in a relatively small total cross-section of the reading light 17. That means that the desired minimum number of light emitting diodes 1 of about 60 light emitting diodes are installed. It will be appreciated that, instead of the hexagonal cross-sections of the individual lenses 4 or the casing bodies 14 and the tubular elements 15, it is also possible to use other cross-sections, for example square, round or triangular cross-sections. In that respect however it must be accepted that the number of light emitting diodes 1 to be included is reduced and that hollow spaces which cannot be filled up remain between the individual light emitting diodes 1 with lenses 4.

As shown in the sectional view in FIG. 4 the reading light 17 is provided with a cover 18 at its bottom end. The bottom cover 18 is adjoined in the axial direction by a tubular casing 19 into which is inserted the disc-shaped mounting 20 for the light emitting diodes 1. The light emitting diodes 1 are mechanically firmly inserted in electrically connected relationship with their connecting legs 21 into the mounting 20. As shown in the detail view of FIG. 2, disposed around the light emitting diodes 1 are the casing bodies 14 with the tubular elements fitted at the front end thereof. The tubular elements 15 adjoin at the end the lens body 4 which is formed in one piece and which is held in position by an annular collar portion of the casing 19. The substantially honeycomb configuration and arrangement of the casing bodies 14 with the tubular elements 15 serves at the same time also to centre the light emitting diodes 1, although the main function of the casing bodies 14 and tubular elements 15 is to pass the light beams of each individual light emitting diode concentratedly on to the lenses 4. In the structure of the reading light 17 shown in FIG. 4 the casing bodies 14 are overall to be viewed as a mechanical centering means for the light emitting diodes 1 and the tubular bodies are to be viewed as an aperture means and a spacer disc for the hexagonal lens bodies 4.

The lenses 4 are normally disposed in mutually parallel juxtaposed relationship. They can however equally well be turned or tilted, thereby providing for deflection of the light beams to constitute light beamswhich are directed on to a single central point. On the basis of the relationships described with reference to FIG. 1 the light beams issuing from the multiplicity of light emitting diodes 1 of the reading light 17 are superimposed to form a single, substantially round light spot. In other words, all circles of the light emitting diodes 1 with lens 4, which are to be seen in the front view of the reading light 17, are superimposed in the focal plane 5 to form a single common light spot. That mode of operation is achieved by observing suitable spacing relationships of the light emitting diode 1 relative to the lens 4 and the focal plane 5 with a focal width in accordance with the formula already referred to above:

$$f = \frac{S_0 \times S_1}{S_0 + S_1}$$

This means that the light emitting diode arranged at the centre in the front view shown in FIG. 3, with only minor lateral differences, forms the same light spot as the light emitting diode 1 provided at the outer edge in the front view of the reading light 17. That provides for the formation in the focal plane 5 of a light circle of given diameter, with a very high level of brightness. Finally only that active light of the light emitting diodes also makes it possible to read documents which are held approximately in the focal plane 5.

FIGS. 5, 6 and 7 show possible arrangements of the light sources or light emitting diodes 1, as a plan view. FIG. 5 differs in the plan view from FIG. 3 in that FIG. 5 shows square lens bodies or casing bodies 14. It will be seen from a comparison of FIGS. 5 and 3 that the hexagonal cross-sectional shape of the lens bodies 4 with casing bodies 14 allows a more compact arrangement.

FIG. 6 shows two front views of reading lights which are both rectangular but have different length and width ratios. In spite of these light sources 1 which adjoin each other in the rectangle, what appears at the focal plane 5 is a substantially identical, round light spot because all individual light spots from the light emitting diodes are superimposed to form a single light spot on the focal plane 5, by virtue of the relationships shown in FIG. 1.

The two examples shown in FIG. 7 also provide that round light spots or light points are produced at the focal plane 5 with the reading lights which are in the form of a circular ring or of a kidney-like shape in front view.

As shown in FIGS. 1 to 7 the light issuing from the light emitting diodes 1 is projected freely on to a focal plane 5 by way of lens bodies 4. As shown in FIG. 8 however it is also possible for the light issuing from the individual light emitting diodes 1 to be coupled into as many light conductors or light guides 23. In that way each light emitting diode 1 as a light source of the reading light 17 is connected to a light guide 23. In that way the light can be passed over a relatively long distance to a light exit 24 which is in the form of a flexible light guide end portion 25 and thereby affords an adjustment region for the light exit. The light guides 23 can be fitted by way of individual coupling elements on to the light emitting diodes 1 or can be fitted on to the light emitting diodes 1 by means of an overall coupling arrangement.

Figure 9:
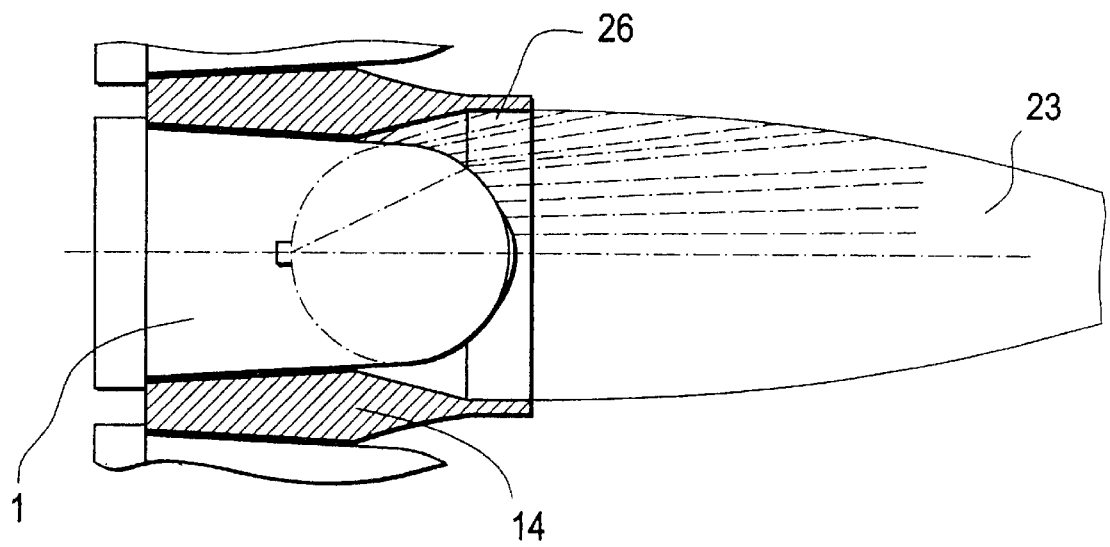
FIG. 9 is a view in section of a single light element with coupled light conductor.

FIG. 9 shows the way in which the light guides 23 are fitted on to the light emitting diodes 1. The arrangement here involves the individual coupling elements 26 which are in the form of enlarged end portions of the light guides 23 and which bear on the one hand around the spherical head of the light emitting diode 1 and which on the other hand bear snugly in the socket or mounting of the casing body 14. The light guides 23 can be held in the casing bodies 14 mechanically by clamping, friction or adhesive.

What is claimed is:

1. An overhead reading light (17) for lighting or illuminating of spaces, bodies or surfaces, said reading light being mounted in a ceiling structure of an aircraft; comprising a plurality of two-dimensionally arrayed light-emitting diodes each being connected to a power supply; a body (14, 15) radially enclosing each of the plurality of said light-emitting diodes (1), said body having a free front end opening for the exit of light emitted by said plurality of diodes, and at least one lens element (4) being inserted in said opening.

2. An overhead reading light as claimed in claim 1, wherein said light-emitting diodes (1) comprise white light-emitting diodes.

3. An overhead reading light as claimed in claim 1 or 2, wherein said body (14, 15) radially enclosing said plurality of light-emitting diodes (1) possesses a non-reflecting surface.

4. An overhead reading light as claimed in claim 1, wherein said body (14, 15) comprises a tubular casing having inner walls extending in parallel with a longitudinal axis of said tubular casing.

5. An overhead reading light as claimed in claim 1, wherein said body (14, 15) comprises a tubular casing having inner walls extending in parallel with an optical axis (6) of said lens element (4).

6. An overhead reading light as claimed in claim 1, wherein said body (14, 15) comprises a tubular casing having inner walls which deviate from a longitudinal axis of said tubular casing.

7. An overhead reading light as claimed in claim 6, wherein said inner walls deviate conically from said longitudinal axis of the tubular casing.

8. An overhead reading light as claimed in claim 6, wherein said inner walls deviate curvedly from said longitudinal axis of the tubular casing.

9. An overhead-reading light as claimed in claim 1, wherein said body (14, 15) is of a hexagonal area in transverse cross-section.

10. An overhead reading light as claimed in claim 1, wherein said body (14, 15) is of a circular area in transverse cross-section.

11. An overhead reading light as claimed in claim 1, wherein said body (14, 15) is of a square area in transverse cross-section.

12. An overhead reading light as claimed in claim 1, wherein said body (14, 15) comprises a centering portion (14) at a foot end, and an aperture portion (15) at a head end which bears against said at least one lens element (4).

13. An overhead reading light as claimed in claim 1, wherein said plurality of light-emitting diodes (1 produce a light (17) with a plurality of said bodies (14, 15) each being hexagonal in transverse cross-section and which are adjoiningly disposed in a honeycomb arrangement.

14. An overhead reading light as claimed in claim 1, wherein a plurality of said lens elements (4) are formed from a common carrier member.

15. An overhead reading light as claimed in claim 14, wherein each said lens element (4) has a hexagonal configuration.

16. An overhead reading light as claimed in claim 12, wherein the centering portion (14) of said body (14, 15) for each respective said light-emitting diode comprises a coupling element for light guides (23).

17. An overhead reading light (17) for lighting or illuminating of spaces, bodies or surfaces, said reading light being mounted in a ceiling structure of an aircraft; comprising a plurality of two-dimensionally arrayed light-emitting diodes each being connected to a power supply; a body (14, 15) possessing a non-reflective light-absorbing internal surface facing and radially enclosing each of the plurality of said light-emitting diodes (1), said body having a free front end opening for the exit of light emitted by said plurality of diodes, and at least one lens element (4) being inserted in said opening.

* * * * *